Figure 3:
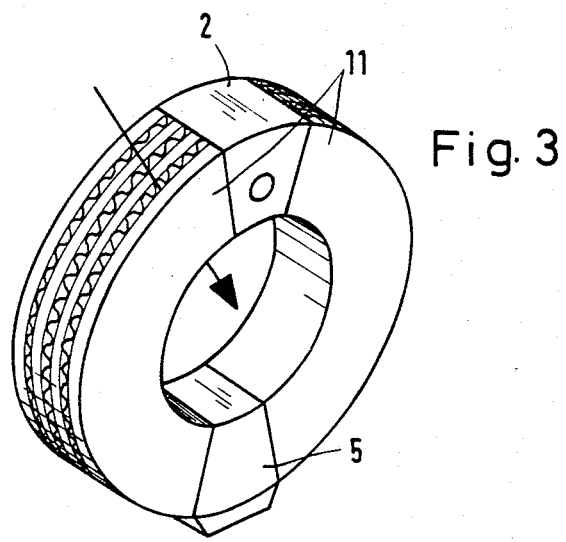

United States Patent [19]

Hofmann

[11] Patent Number: 4,532,775
[45] Date of Patent: Aug. 6, 1985

[54] AIR COOLER WITH CONDENSATE TRAP

[76] Inventor: Rudolf Hofmann, c/o ISARTALER Schraubenkompressoren GmbH, Wallensteinstrasse 20, 8192 Geretsried 2, Fed. Rep. of Germany

[21] Appl. No.: 512,573

[22] Filed: Jul. 11, 1983

Related U.S. Application Data

[63] Continuation of Ser. No. 230,516, Feb. 2, 1981, abandoned.

[30] Foreign Application Priority Data

Feb. 12, 1980 [DE] Fed. Rep. of Germany ... 8003708[U]

[51] Int. Cl.³ .............................................. F25D 21/00
[52] U.S. Cl. ......................................... 62/272; 55/269; 55/414
[58] Field of Search ............... 55/269, 268, 208, 413, 55/414; 62/272, 273, 93, 92

[56] References Cited

U.S. PATENT DOCUMENTS

| 1,899,988 | 3/1933 | Ruemelin | 55/269 |
| 2,935,856 | 5/1960 | Gifford | 62/272 X |
| 3,367,120 | 2/1968 | Franklin | 62/272 X |
| 3,922,151 | 11/1975 | Kiss et al. | 55/269 X |
| 3,981,699 | 9/1976 | Molitor | 55/269 X |
| 4,038,051 | 7/1977 | Ide | 55/269 X |

Primary Examiner—Henry Bennett
Attorney, Agent, or Firm—Wood, Dalton, Phillips, Mason & Rowe

[57] ABSTRACT

A ring-shaped air cooler has an inlet at the top and an outlet at the bottom. A peripheral wall surrounds the outlet and projects upwardly forming a condensate trap. Air admitted at the inlet flows in two streams through each half of the ring. The streams impinge on and are deflected by surfaces of the wall, removing condensate therefrom.

5 Claims, 4 Drawing Figures

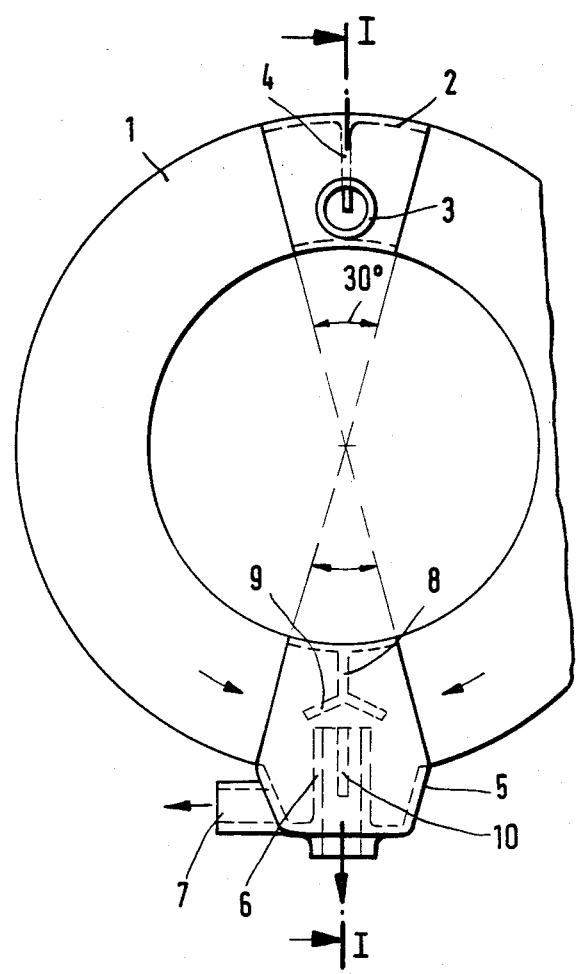
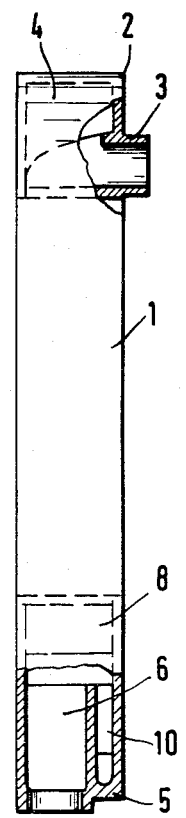
Fig.1
Fig. 2

AIR COOLER WITH CONDENSATE TRAP

This is a continuation of application Ser. No. 230,516, filed Feb. 2, 1981, now abandoned.

The invention relates to an air cooler with a condensate trap, especially an aftercooler for a compressor unit.

The invention is based on the problem to develop such a cooler in such a way that it can be arranged favorably on a compressor and has a trapping device which has a simple but effective construction.

According to the invention this is achieved by the fact that there is provided a ring-shaped cooler having in the upper part an air inlet and having at the lowest spot of the cooler a chamber through which the air flows out and which is provided with a condensate discharge which has an air outlet connection protruding into the chamber. The outside wall of the air outlet connection protruding into the chamber serves as a rebounding suface for the air streams which, with the ring-shaped cooler, enter the chamber from two sides so that on the outside surface of the air outlet connection water condenses and flows downward to the condensate discharge.

Expediently there is provided above the air outlet connection a rebounding surface which, for instance, can be designed invertedly T-shaped so that it covers the outlet opening of the air outlet connection.

For a ring-shaped cooler, the condensate trap is expediently designed sector-shaped. It can be put together of sheet metal parts or also made as a casting.

An example of an embodiment according to the invention is explained in detail in the following by means of a drawing. There show FIG. 1 a front view of a ring-shaped cooler with a condensate trap, FIG. 2 a view of a cut according to line I—I, and FIGS. 3 and 4 two types of cooling air feed.

In FIG. 1, there is signified by 1 a ring-shaped cooler, for instance, an aftercooler for a screw-type compressor unit consisting of two semicircular parts. On the upper part of the ring-shaped cooler there is made between the two cooler parts a sector-shaped inset 2 with an air inlet connection 3. By 4, there is signified a reinforcing inlet rib—serving as a distributor for the air stream—of the inset part 2 made as a casting.

On the lower part of the ring-shaped cooler 1 there is inserted—similar to the inset body 2—a sector-shaped condensate trap 5 between the two semicircular cooler parts. This condensate trap 5 forms a chamber into which the air flows from both sides of the ring-shaped cooler for discharge thereof, as indicated by arrows. In the condensate trap 5 there is an air outlet connection 6 which projects vertically upward from the straight bottom surface of the condensate trap 5. The air flowing on both sides of the ring-shaped cooler into the chamber of the condensate trap 5 is led against the outside wall of this air outlet connection 6 so that this outside wall thus works as a rebounding separator. The condensate separated in the cooler runs along the lower outside wall of the cooler into the chamber of the condensate trap 5 on whose bottom the condensate separated along the outside of the air outlet connection 6 is collected.

A condensate discharge arranged on the extension of the condensate chamber is illustrated at 7.

The air outlet connection 6 can extend over the entire height of the condensate trap 5—with the upper edge of the air outlet connection having only a slight distance from the upper wall of the condensate trap so that a rebounding surface as large as possible exists for the air flowing from both sides. On the illustrated embodiment, the air outlet connection 6 extends approximately over half of the measured height of the condensate trap—with a reinforcing trap rib 8 being arranged above it which has on the lower end two crosspieces 9 which are arranged roof-like and cover the air outlet opening. This reinforcing trap rib 8 serves to guide the air stream and serves simultaneously as rebounding separator.

According to another embodiment, there can be provided also two adjacent reinforcing walls or reinforcing ribs which have a distance from each other corresponding approximately to the diameter of the air outlet connection 6.

On the illustrated embodiment, the condensate trap 5 has the form of two trapeziums placed one to the other. Other formations can also be provided, for instance, with a bottom wall arranged slanting in the direction of the run-off of the condensate. The sector-shaped part of the condensate trap has preferably the same dimensions as the sector-shaped inset body 2 at the air inlet, as it is indicated by the agreeing center angles of 30°. At 10, there is indicated a reinforcing chamber rib which is distant from the bottom surface of the condensate chamber.

FIG. 3 shows an embodiment where the cooling air—as indicated by an arrow—flows radially through the two cooler parts from the outside to the inside. The cooling air can also be led radially from the inside to the outside through the cooler. This embodiment according to FIG. 3 has the advantage that two opposite cooler parts can be formed by identical disk-like laminae 11 for the air to be cooled.

Figure 4:
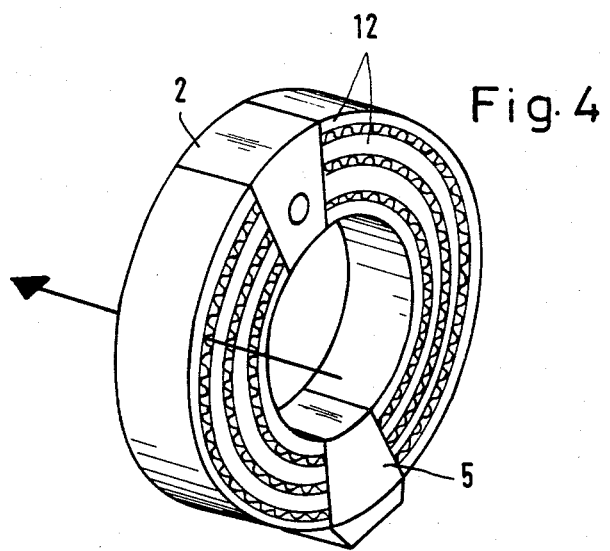

On the embodiment according to FIG. 4, the cooling air flows through the ring-shaped cooler in the axial direction—with dish-shaped annular parts 12 being provided for the air to be cooled.

I claim:

1. A gas cooler and condensate trap comprising:
   a housing defining a gas flow passage with an inlet at the top and an outlet at the bottom, gas entering the inlet being cooled as it flows through the housing to the outlet;
   a wall extending upwardly around the periphery of said outlet, the cooled gas impinging on the outside of said wall enhancing the separation of condensate from the cooled gas, said wall preventing the separated condensate from reaching the outlet, said housing and wall forming a trap for said separated condensate;
   a trap rib disposed above and described toward said outlet wall, said trap rib having cross pieces extending outwardly therefrom, the cross pieces being spaced from and projecting over said outlet wall to guide said gas and remove condensate therefrom; and
   a condensate discharge from said trap.

2. A cooler and trap for cooling and removing condensate from a gas comprising:
   a ring-shaped cooler having a top inlet and a bottom outlet, said gas being admitted through said inlet to divide and flow in two streams in opposite directions through each half of the ring for cooling of the gas and the gas being discharged through said outlet;

a condensate trap disposed in the bottom of said cooler for collecting said condensate, said trap including a peripheral wall surrounding said outlet and projecting upwardly from the bottom wall of the cooler to define spaced surfaces in the path of both streams of gas to deflect both streams of gas and remove condensate; and a condensate discharge communicating with said trap to remove condensate from said cooler.

3. The cooler of claim 2 having an inlet rib disposed within said cooler adjacent said inlet to direct the gas admitted through said inlet to flow in opposite directions about said cooler toward said outlet.

4. The cooler and trap of claim 2 wherein the ring-shaped cooler comprises a plurality of axially spaced apart rings, each ring comprising two identical semicircular parts, cooling air flowing radially between the rings.

5. The cooler and trap of claim 4 in which the semicircular parts of the rings are joined by sector-shaped inlet and trap sections.

* * * * *